United States Patent [19]

Allis

[11] 4,013,361

[45] Mar. 22, 1977

[54] OPTICAL APPARATUS AND REPRODUCING MACHINE

[75] Inventor: Robert F. Allis, Rochester, N.Y.

[73] Assignee: Xerox Corporation, Stamford, Conn.

[22] Filed: June 20, 1975

[21] Appl. No.: 588,973

[52] U.S. Cl. .................................. 355/60; 354/189; 355/8; 355/51; 355/52; 355/66

[51] Int. Cl.² .......................................... G03B 27/70

[58] Field of Search .............. 355/8, 11, 51, 57, 60, 355/65, 66, 52; 354/189, 190

[56] References Cited

UNITED STATES PATENTS

| | | | |
|---|---|---|---|
| 2,293,598 | 8/1942 | Drucker | 354/189 |
| 3,479,945 | 11/1969 | Koch | 354/189 X |
| 3,703,334 | 11/1972 | Knechtel | 355/11 |
| 3,711,199 | 1/1973 | Koizumi | 355/60 X |
| 3,740,137 | 6/1973 | Sato | 355/66 |
| 3,778,153 | 12/1973 | Iki | 355/66 |
| 3,829,209 | 8/1974 | Buddendeck et al. | 355/66 X |

FOREIGN PATENTS OR APPLICATIONS

| | | | |
|---|---|---|---|
| 1,336,819 | 11/1973 | United Kingdom | 355/65 |

OTHER PUBLICATIONS

IBM Technical Disclosure Bulletin, vol. 14, No. 6, Nov. 1971, pp. 1766 & 1767.

*Primary Examiner*—Richard A. Wintercorn

[57] ABSTRACT

An apparatus for viewing an original and for projecting an image thereof onto a moving imaging surface and a reproducing machine employing the apparatus. The apparatus includes a lens arranged along an optical path. The projected image magnification may be changed by translating the lens in a plane of motion between first and second positions. Apparatus are provided for tilting the lens with respect to the plan of motion to a different extent at the first position than at the second position to thereby reduce the occurrence of vignetting in the optical system.

24 Claims, 9 Drawing Figures

OPTICAL APPARATUS AND REPRODUCING MACHINE

CROSS REFERENCE TO RELATED APPLICATION

U.S. application Ser. No. 588,971, filed June 20, 1975, to Hoppner et al. for a multi-mode reproducing apparatus.

BACKGROUND OF THE INVENTION

This invention relates to an apparatus for viewing an original and projecting an image thereof onto a moving imaging surface, and to multi-mode reproducing apparatus preferably of the electrostatographic type.

A variety of electrostatographic reproducing machines are commercially employed which have different modes of operation. One type of machine utilizes a moving original exposure system wherein an original document is moved past a fixed slit optical system for projecting an image onto the moving photoconductive surface. These machines include a means for changing the magnification of the projected image to provide reduction copies. Exemplary of patents in this area is U.S. Pat. No. 3.076,392, to Cerasani et al.

Other machines have been adapted to copy stationary original documents at a variety of magnifications or reductions through the use of a scanning optical system. Exemplary of patents in this area are U.S. Pat. Nos. 3,476,478, to Rees, Jr.; 3,542,467 to Furgeson; 3,614,222 to Post; and 3,837,743 to Amemiya. Another approach which has been utilized for projecting images for reproduction at varying magnifications from a stationary original comprises full frame exposure. Exemplary of patents in this area are U.S. Pat. Nos. 3,543,289 to Koizumi; 3,687,544 to Muller; 3,703,334 to Knechtel; and German Offenlegungsschrift 2,154,944 to Libby.

U.S. Pat. Nos. 3,703,334 to Knechtel and 3,837,743 to Amemiya set forth above are also significant in that they disclose the use of a separate reflector or add reflectors, respectively which are selectively positionable in the optical path for changing the conjugate distance of the optical system for providing varying magnifications.

The aforenoted machines are adapted to provide one or more modes of copying having different magnifications. Other forms of multi-mode copiers are available commerically. For example, in the Xerox 3100 LDC machine an optical system is provided which enables the machine to copy from a stationary original in a first scanning mode or from a moving original in a second fixed optical mode. This latter mode being particularly adapted for copying documents larger than the conventional viewing platen size. U.S. Pat. No. 3,877,804 to Hoppner is illustrative of a machine similar in many respects to the 3100 LDC machine.

Reproducing apparatuses including the capability of making copies from both moving and stationary originals are also described in U.S. Pat. No. 3,833,296 to Vola and in IBM Technical Disclosure Bulletin, Vol. 12, No. 1, at page 173, June 1969.

It has been found desirable to provide multi-mode reproducing apparatus having the unique features of the 3100 LDC machine including its extremely compact size, but also having the capability of reduction copying.

When one attempts to employ a multi-mode optical system in a highly compact environment difficulties arise such as vignetting. Vignetting comprises the loss of a portion of the image through the interference in the optical path of one or more elements within the optical cavity. For example, mirror carriages frame elements in the optical cavity interfere with the light paths and block portions of them thereby reducing the quality of the resulting image. With a compact optical system it is difficult to provide multiple lens positions and other optical elements and frames in an arrangement wherein vignetting will not pose a serious problem.

SUMMARY OF THE INVENTION

Therefore, in accordance with the present invention, an optical apparatus and reproducing apparatus employing it are provided which include a lens translation arrangement adapted to reduce the occurrence of vignetting.

In accordance with this invention an apparatus is provided for viewing an original and for projecting an image thereof onto a moving imaging surface such as a photoconductive or photosensitive surface. The apparatus includes a lens arranged along an optical path and means for changing the projected image magnification. The magnification changing means includes means for translating the lens in a plane of motion between first and second discrete positions so that the projected magnification is a function of the lens position. Vignetting is minimized by providing means for tilting the lens with respect to its plane of motion so that it is inclined with respect to that plane to a greater extent at its first position than at its second position.

Preferably, the apparatus comprises a part of the scanning optical means for viewing a stationary original which can be fixed at a given position for viewing a moving original. Preferably, the apparatus includes a means for changing the conjugate of the scanning optical system at its fixed position, which includes an add reflector selectively positionable into the optical path. Preferably, means are provided for coordinating the movement of the lens and add reflector between their respective operating positions.

In accordance with the preferred embodiment, a drive system is provided including compliance means to allow the lens carriage to be biased against stop members through the continued operation of the motor drive after the carriage engages the stops. Compliance means are also preferably provided for the lens carriage itself to reduce the chances of its binding up as it travels along its support rails.

A reproducing machine employing the above-noted optical apparatus also forms part of the present invention. Preferably, the reproducing machine comprises an electrostatographic machine.

Accordingly, it is an object of this invention to provide an apparatus for viewing an original and for projecting an image thereof onto a moving imaging surface.

It is a further object of this invention to provide an apparatus as above including means for reducing vignetting.

It is a still further object of this invention to provide an apparatus as above including means for translating a lens between respective positions associated with given magnifications and means for tilting the lens with respect to its plane of motion.

It is a further object of this invention to provide a reproducing apparatus incorporating the above-noted viewing apparatus.

These and other objects will become more apparent from the following drawings and description.

DETAILED DESCRIPTION OF THE PREFERRED EMBODIMENT

In the background of this invention there has been set out a number of patents dealing with reproducing apparatuses adapted to function in one or more optical modes wherein the magnification is changed between modes. Some of the apparatuses are capable of imaging from a moving or a stationary document. When one attempts to combine the various modes of operation in a single reproducing apparatus of a fairly compact nature significant problems arise because of the necessity in a reduction mode of operation to change the conjugate on the image or object side of the lens.

In accordance with the present invention a viewing apparatus and a multi-mode reproducing apparatus incorporating the viewing apparatus is provided having an extremely compact arrangement. Through the use of a unique lens translation mechanism vignetting is substantially reduced.

In accordance with this invention an apparatus is provided for viewing an original and for projecting an image thereof onto a moving imaging surface. The apparatus includes a lens arranged along an optical path. Means are provided for changing the projected image magnification wherein the magnification changing means includes means for translating the lens in a plane of motion between a first and second discrete position so that the projected magnification is a function of the lens position. Means are also provided for tilting the lens with respect to its plane of motion to a different extent at the first position than at the second position so as to obtain differing lens orientations with respect to the plane of motion.

Figure 1:
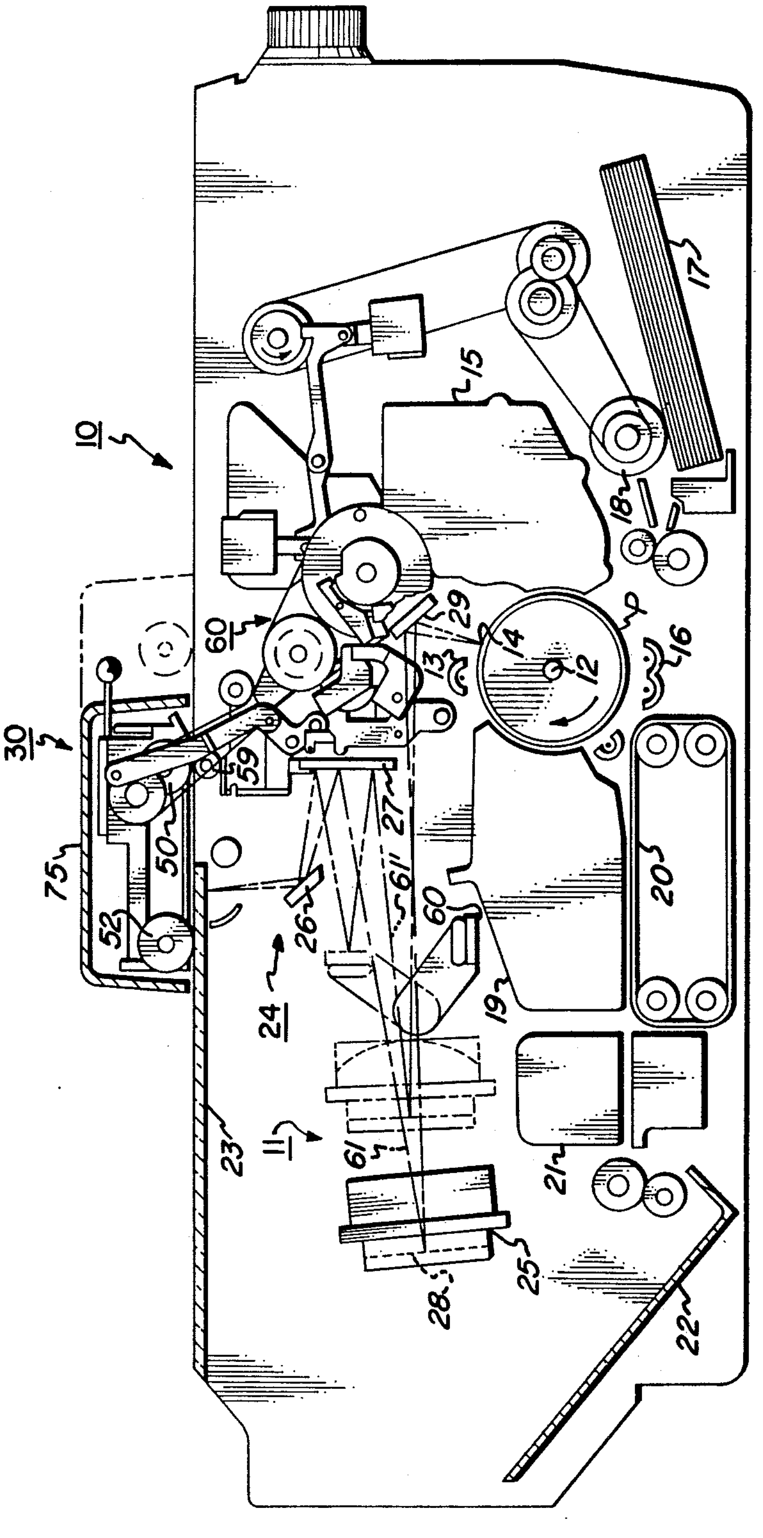
FIG. 1 is a schematic view of a reproducing apparatus in accordance with one embodiment of the present invention.

Referring now to FIG. 1, there is shown by way of example an electrostatographic reproducing machine 10 which incorporates the apparatus 11 of the present invention. The reproducing machine 10 depicted in FIG. 1 illustrates the various components utilized therein for xerographically producing copies from an original. Although the apparatus of the present invention is particularly well adapted for use in an automatic xerographic reproducing machine 10, it should become evident from the following description that it is equally well suited for use in a wide variety of electrostatographic systems and is not necessarily limited in its application to the particular embodiment shown herein.

Basically, the xerographic processor includes a rotatably mounted photoconductive drum P which is supported upon a horizontally extended shaft 12. The drum is driven in the direction indicated whereby its photoconductive surface is caused to pass sequentially through a series of xerographic processing stations.

The practice of xerography is well-known in the art, and is the subject of numerous patents and texts, including *Electrophotography* by Schaffert, published in 1965, and *Xerography and Related Processes*, by Dessauer and Clark, published in 1965. Therefore, the various processing steps involved will be briefly explained below in reference to FIG. 1. Initially, the photoconductive drum surface is uniformly charged by means of a corona generator 13 positioned within a charging station located at approximately the 12 o'clock drum position. The charged drum surface is then advanced into an imaging station 14 wherein a flowing light image of an original document to be reproduced is projected onto the charged drum surface thus recording on the drum a latent electrostatic image containing the original input scene information. Next, subsequent to the exposure step in the direction of drum rotation is a developing station 15 wherein the latent electrostatic image is rendered visible by applying an electroscopic marking powder (toner) to the photoreceptor surface in a manner well known and used in the art. The now visible image is then forwarded into a transfer station 16 wherein a sheet of final support material is brought into overlying moving contact with the toner image and the image transferred from the plate to the support sheet by means of a second corona generator 16.

In operation, a supply of cut sheets are supported within the machine by means of a paper cassette 17. A pair of feed rollers 18 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference may be had to U.S. Pat. No. 3,731,915 to Guenther.

After transfer, but prior to the reintroduction of the imaged portion of the drum into the charging station, the plate surface is passed through a cleaning station 19 wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 20 which serves to advance the support sheet into a thermal fusing station 21 wherein the toner image is permanently fixed to the sheet. The copy sheet with the fused image thereon is forwarded from the fuser into a collecting tray 22 where the sheet is held until such time as the operator has occasion to remove it from the machine.

Normally, when the copier is operated in a conventional mode, the original document to be reproduced is placed image side down upon a horizontal transparent viewing platen 23 and the stationary original then scanned by means of the moving optical system 24. The scanning system 24 fundamentally consists of a lens 25 positioned below the right hand margin of the platen as viewed in FIG. 1, and a pair of cooperating movable scanning mirrors 26 and 27. The lens is basically a half-lens objective having a reflecting surface 28 at the stop position to simulate a full lens system. The two mirrors are slidably supported between a pair of parallel horizontally aligned guide rails (not shown). For a further description and greater details concerning this type of optical scanning system reference is had to U.S. Pat. No. 3,832,057 to Shogren.

In practice, mirror 26, herein referred to as the full rate scan mirror, is caused to move from a home position, directly below the left hand margin of the platen to an end of scan position below the opposite margin of the platen. The rate of travel of the scan mirror is synchronized to the peripheral speed of the rotating xerographic drum surface P. The second mirror 27 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards a stationary mirror 29 positioned directly above the drum surface at the exposure station 14. In this manner a flowing light image containing the original input scene information is focused upon the charged photoconductive plate.

A wind up spring (not shown) is provided to restore the moving mirrors to a start of scan condition.

The copying apparatus 10 shown in FIG. 1 is provided with a document feeder 30. The document feeder 30 is movable between a first stored position adjacent to the viewing platen 23 and a second operative position over the platen surface. Commensurate with the positioning of the feeder assembly over the platen, the moving optical system 24 is locked in a position to view documents as they are advanced by the document feeder over the platen and record a flowing light image of the input information upon the moving photoconductive plate surface P.

Figure 2:
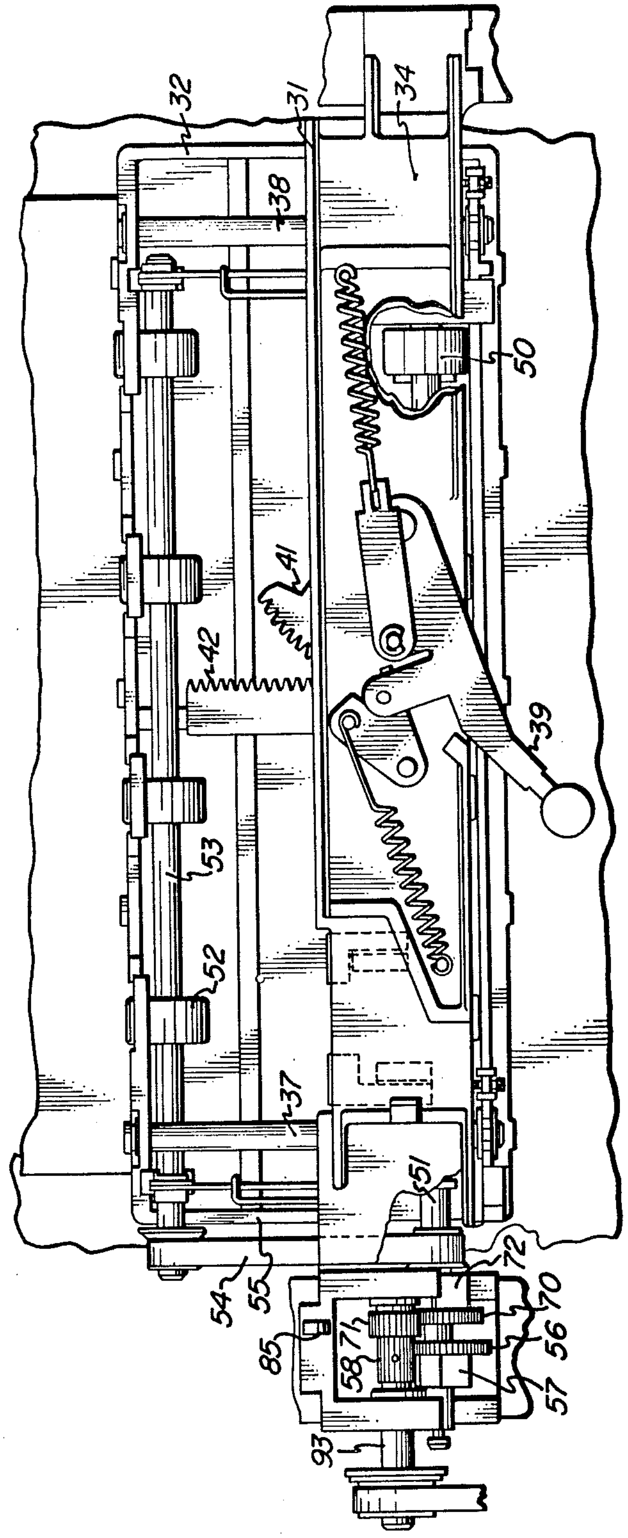
FIG. 2 is a partial top view of the apparatus of FIG. 1 showing the document feeder with the cover removed.

Referring now more specifically to FIGS. 1 and 2, there is shown the document feeding mechanism 30 associated with the instant invention. During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area for the operator.

To initiate the moving document mode of operation, the machine operator simply advances the document feeding assembly 30 from the stored position to a document feeding position with the feeding assembly extending over the left hand margin of the platen surface. Fundamentally, the document feeding mechanism is made up of two main sections which include a stationary support bridge, generally referenced 31, and a movable feed roller support section, generally referenced 32. The bridge 31 is made up of two vertically extending end support members which are securely anchored in the machine frame and upon which is secured a horizontal span 34. The feed roller support section 32 is slidably suspended from the horizontally extended span 34 by means of a pair of parallel aligned rod-like guide rails 37 and 38 which are slidably supported in bearings (not shown) affixed to the underside of the bridge span. The document feed roll assembly is thus suspended from the span so that it can be freely moved back and forth from the home or stored position adjacent to the platen 23 and an extended position over the left hand margin of the platen surface.

In practice, at the start of the moving document handling conversion cycle, the machine operator grasps a lever arm 39 mounted on top of the bridge span and rotates the arm in a clockwise direction as shown in FIG. 2. The lever arm is operatively connected to segmented pinion 41 which meshes with a rack 42 secured to the feed roller assembly 32. Movement of the arm in a clockwise direction causes the movable feed roller assembly to be advanced toward the fully extended or operative position. Rotation of the arm in the opposite direction produces the opposite result.

Manually moving the feed roller support assembly 32 to the extended position also physically closes the contacts of a large document mode switch (not shown) causing a signal to be sent to the main machine drive motor (not shown) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processed and there is, therefore, no need to feed copy sheets through the copier. In point of fact, feeding a copy sheet during the conversion phase would have a deleterious effect on the various machine components as well as confusing the machine programming and registering system. To prevent this occurrence, means 60, as shown in FIG. 1, are provided for inhibiting the action of the paper feeder during the period when the machine is being converted to the moving document mode of operation. Means 60 also provide for locking the optics at the end of scan position during the moving original mode of operation. Means 60 comprise a lock-out mechanism which serves to both uncouple the drive shaft from the main drive system and hold the optics rigidly in a fixed position for viewing moving documents subsequently advanced through the document feeding assembly 30.

Further details of the inhibitor and lock-out means 60 may be obtained by reference U.S. application Ser. No. 367,996, now U.S. Pat. No. 3,900,258, and U.S. Pat. No. 3,877,804.

The movable document feed roller support section 32 of the document feeder assembly is provided with two sets of co-axially aligned rollers comprising a first set of drive rollers 50 mounted upon shaft 51 and a second set of hold down drive rollers 52 mounted upon shaft 53. The two roller support shafts are connected by means of a timing belt 54 whereby each set of rollers is adapted to turn in coordination with the other set of rollers. Shaft 57 is arranged to extend beyond the end wall 55 of the movable document feeder roll support section 32 and has a gear 56 rotatably supported thereabout by normally engaged wrap spring clutch 57. In operation gear 56 is adapted to move into and out of meshing contact with the stationary driven gear 58 as the document feed roll section is moved between its stored and fully extended position. When placed in a fully extended position, as shown in FIG. 2, the gear 56 meshes with gear 58 thus causing both the document feed rollers 50 and the hold down rollers 52 to be rotated. Directly below the stationary bridge and adjacent to the platen margin are a set of pinch rollers 59 (FIG. 1) which are rotatably supported in the machine frame. The pinch rollers are arranged in the machine frame so as to coact with the feed rollers 50 when the document feeder 30 is in the operative position so as to advance a document introduced therebetween. In operation, the document is moved past the viewing domain of the now fixed optical assembly 24 and then into the pinch between the hold down rollers 52 and the platen 23 surface. The hold down rollers 52 serve to hold the document in sliding contact with the platen surface as the original is being moved past the optics and to feed the document after it leaves the pinch of rolls 50 and 59.

The rolls 50 and 52 in the feeder 11 shown are continuously driven during machine operation even when no sheet is being fed.

The machine which has been discussed thus far is similar in many respects to the aforenoted Xerox 3100 LDC copier. It is capable of operating in a number of modes including a scanning mode wherein a stationary original is scanned by the moving optical system 24 as well as a moving original mode wherein the original itself is moved in synchronism with the peripheral velocity of the drum and the optical system is held stationary. This latter approach is useful only in a single copy mode in the apparatus described; however, it facilitates the copying of originals having a size larger than the platen.

In accordance with the present invention yet another mode of operation is provided for a reproducing machine. This additional mode of operation comprises a reduction mode wherein the image on the original is reduced in size by the optical system for projection onto the photosensitive surface whereby the image which is transferred to the sheet of final support material is similarly reduced in size. In accordance with the reproducing machine of this invention, the reduction mode is accomplished by a moving original exposure system.

For the reduction mode of operation it is necessary to translate the lens 25 to change the conjugate distance between the lens and the object or image planes. Further, it is necessary to advance the document past the fixed optics 24 at a velocity greater than the peripheral velocity of the drum P.

In accordance with a preferred embodiment of the present invention, the previously noted optical system of the Shogren patent is modified to provide for lens translation and the insertion of an add mirror 60 into the optical path to change the platen 25 to lens conjugate. The optical system which is utilized herein is similar in most respects to that described in application, Ser. No. 588,774 to Spinelli et al. The optical system of that application provides in addition to the optical system of the Shogren patent an add reflector 60 which is selectively positionable into the optical path to combine with the half rate mirror 27 to form a reflection cavity and increase the object distance for magnification change. The lens 25 is movable relative to the optical path to adjust the conjugate distance. Of course, by the nature of a half (Catadioptric) lens 25 with its associated reflector 28 the optical path incident to the lens and reflected back through the lens is at some angle relative to the lens axis. When a magnification change necessitates repositioning of the lens, the repositioning must take into account the divergence of the lens axis and optical path. In the optical system described in the aforenoted Spinelli et al application, the insertion of the add reflector 60 displaces the optical path 61 to 61' and, therefore, the lens 25 with its lens reflector 28 is shifted to satisfy conjugate distance requirements and to remain centered on the optical (principal ray) path, 61'.

It is a unique feature of this optical system that the add mirror 60 does not form part of the scanning optical arrangement so that no adjustment is necessitated in the drives for the scanning mirrors irrespective of which magnification mode is selected. The provision of an add mirror 60 independent of the scanning optical system, which may be positioned in and out of the optical ray path of the scanning optical system provides a further advantage by reducing the mass of the scanning mirror assembly as compared with the prior art. The optical system 24 proposed herein is far superior to the prior art since during the scanning operation the full rate and half rate carriages carry but a single mirror 26 and 27 respectively thereby providing a minimized scanning mass and reduced dynamic problems.

Having thus described the basic outline of an exemplary reproducing apparatus 10 in accordance with this invention, attention will now be directed to specific elements of the apparatus which enable it to carry out the reduction mode of operation.

Figure 3:
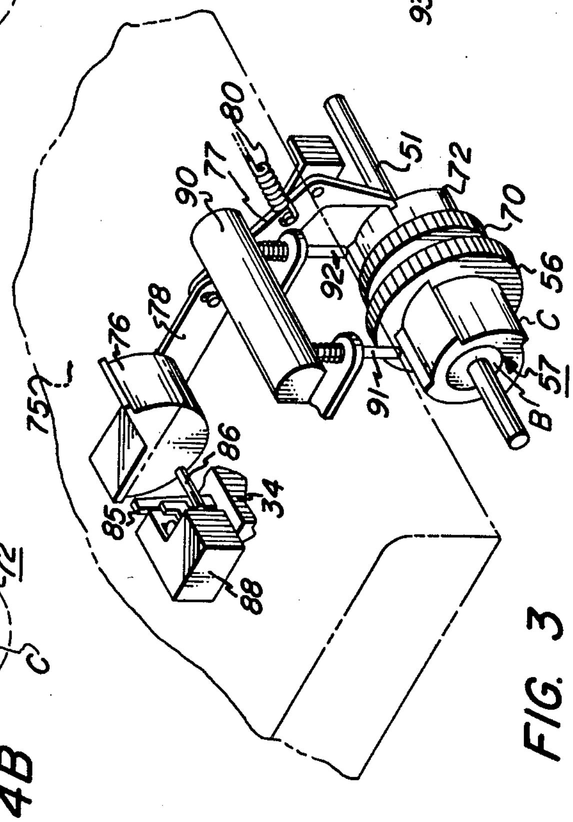
FIG. 3 is a partial perspective view of the document feeder drive system in accordance with one embodiment of this invention.

Referring now to FIGS. 2 through 4, the drive system for the document feeder 30 is shown in greater detail. The drive system includes a first pair of meshing gears 56 and 58 which comprise a low speed gear pair. The gear 56 on the roll shaft 51 is rotatably supported thereabout and connected thereto by a wrap spring clutch 57 of conventional design such as the Series 15 clutches available from Reell Precision Manufacturing Company, St. Paul, Minn. The clutch 57 shown includes a boss element B which is pinned to the shaft 51, a spring (not shown) is wrapped about a boss (not shown) on gear 56 and is secured to the boss element B at one end and to a detent collar C at its other end. The spring is arranged to normally wrap tightly about the boss of the free wheeling gear 56 to engage the gear 56 to the shaft 51. Further details of the low speed gear pair and wrap spring clutch arrangement can be found in the aforenoted Hoppner U.S. Pat. No. 3,877,804. A stop switch 90 is provided in the feeder head which has a pin 91 for engaging the detent collar to disengage the drive gear 56 from the roll shaft 51 in order to stop the rolls 50 of the document feeder 30. When the collar C is engaged by the pin 91, the spring inside the collar unwraps so as to withdraw it from engagement with the boss of gear 56 which then free wheels.

In accordance with an embodiment herein additional progressively higher speed gear pairs are provided on the respective drive 93 and roll shafts 51. In the embodiment of FIGS. 2 – 4, a single additional gear pair 70 and 71 is provided. The gear 71 on the drive shaft 93 is pinned thereto. The gear 70 on the roll shaft 51 is rotatably supported with respect thereto by means of a wrap spring clutch in a manner similar to gear 56.

Both this clutch and the previously noted clutch 56 are of an overrunning type. The clutch 72 is normally engaged and may be disengaged by the speed changing mechanism catch 77 intercepting the detent collar C. When the clutch 72 is engaged, the clutch 57 is overrun so that the speed of the mechanism is controlled by the high speed gear pair 70 and 71. To change to a lower speed as might be employed, for example, for 1 to 1 copying or for a lesser reduction, the catch 77 engages the detent collar C of the high speed clutch 72 thereby disengaging the high speed gears 70 and 71 from the roll shaft 51. The shaft 51 is then rotated in accordance with the speed imparted by the low speed gear pair 56 and 58 through the engaged clutch 57. In this situation the high speed clutch 72 is not overrunning, but is disengaged.

Therefore, in accordance with the present invention by providing additional higher speed gear pairs and associated overrunning clutches, it is possible to change the speed of the drive rolls 50 of the document feeder 30 to the speed imparted by the highest speed gear pair having an engaged clutch. All lower speed gear pairs and their clutches are overrun.

The speed changing mechanism comprises a butterfly type switch member 76 pivotally supported by the document feeder cover 75. The detent collar catch 77 is also pivotally supported by the document feeder cover and connected by means of link 78 to the butterfly switch member 76. A spring 80 provided between the cover member 75 and the catch 77 biases the catch into engagement with the detent collar C of the high speed gear clutch 72. A lost motion slot 79 is provided in the link 78 to account for motion of the catch member 77 caused when its tip intercepts the detent collar C at a position other than the catch position. The detent collar will continue to rotate with the gear 70 and clutch 72 until the tip of the catch intercepts the catch portion of the detent collar as shown. The lost motion slot 79 allows for movement of the catch member 77 during this period even though the switch member 76 itself has been fully actuated.

The stop button 90 which is similar to that described in U.S. Patent No. 3,877,804 includes an additional pin member 92 for intercepting the detent collar C of the high speed gear clutch 72. The rolls 50 may be stopped by depressing the STOP button which disengages both the high speed gear 70 and low speed gear 56 from the document feeder drive shaft 51.

A mode changing switch 88 is provided which is secured to the document feeder cover 75 and which may be intercepted by a pin 86 eccentrically mounted to the butterfly switch actuator 76. The mode changing switch 88 is utilized to condition the apparatus 70 for the appropriate mode of operation. For example, if the switch actuator 76 is placed in the reduction position as in FIG. 4A so that the high speed gears 70 and 71 are engaged then the mode switch 88 would be closed which would cause the lens 25 and add mirror 60 to be positioned in the appropriate arrangement for reduction copying shown in phantom in FIG. 1. Similarly, deactuation of the mode switch 88 when the document feeder is moved off and on the platen or when the switch actuator 76 is moved to the non-reduction position would condition the apparatus 10 to return to the 1 to 1 or other desired base mode of operation and cause the lens 25 and add mirror 60 to be positioned in their home positions as shown in solid lines in FIG. 1.

Since it is believed that the reduction mode of operation would be the least used mode, an automatic means for returning the apparatus to the 1 to 1 mode or other base mode has been provided. Automatic mode changing is provided in the embodiment shown in FIGS. 1 – 4 when the document feeder 30 is moved off and on the platen 23 following reduction copying. This automatic mode changing is accomplished in accordance with the embodiment shown, by the pin 86 on the switch actuator 76, being engaged upon movement of the carriage off and on the platen by a spring member 85 to return the switch actuator 76 to its normal mode position.

Figure 4A:
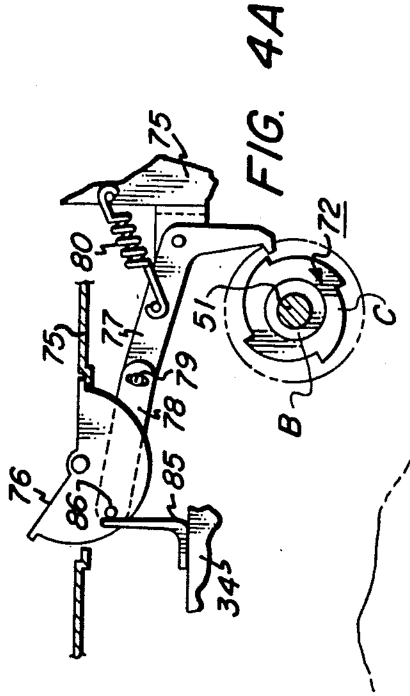
FIGS. 4A and 4B comprise partial side views illustrating the operation of the drive selection mechanism.
Figure 4B:
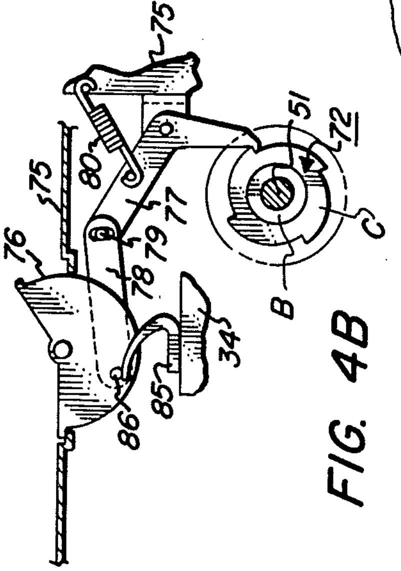

Referring to FIG. 4A, the speed changing mechanism is shown with the document feeder 30 off the platen and the switch actuator 76 in the reduction position. This would occur if the document feeder is moved off the platen while the switch 76 is in the reduction position. Upon movement of the document feeder back onto the platen 23 for either large document copying, stream feeding of documents, or reduction copying, the leaf spring member 85 intercepts the switch actuator pin 86 and causes the switch to rotate to the base mode or lower speed position as shown in FIG. 4B. The leaf spring member 85 is then deflected and passes under the pin 86 as the carriage 32 continues its movement onto the platen. In this manner it is not possible for the document feeder 30 to be placed off and on the platen 23 with the apparatus 10 remaining in a reduction mode. The apparatus would, upon the document feeder being placed again on the platen, automatically convert to the base mode. Therefore, by incorporating a switch actuator return mechanism 85 and 86 in accordance with this invention the apparatus 10 is automatically conditioned for a base mode of copying upon movement of the document feeder 30 off and on the platen following a reduction copying run.

The automatic mode changing apparatus described above is effective to change the mode of operation upon movement of the document feeder 30 onto the platen 23 after it has been moved off the platen. If the document feeder is moved off the platen in the reduction mode, and it is then desired to use the scanning mode of operation, the machine logic would accomplish this mode change and move the lens and add mirror to their appropriate home positions. Alternatively, if desired, a mechanical type system similar to the one described above could be utilized which would automatically switch the switch actuator to the base mode position upon movement of the document feeder off the platen.

In the apparatus 10 thus far described only one high speed gear pair 70 and 71 has been provided which in turn provides only a single additional reduction mode. It is possible, in accordance with the present invention, to provide further modes of reduction at different values of reduction or magnification by the use of additional gear pairs.

Figure 5:
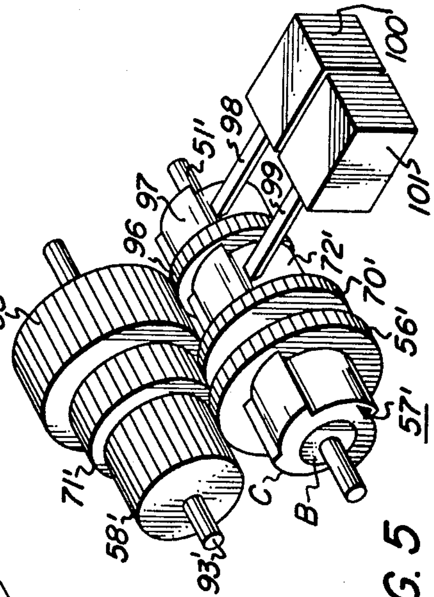
FIG. 5 is a perspective view of an alternative embodiment of a drive mechanism in accordance with this invention.

Referring to FIG. 5, a drive system is shown comprising a three speed system having three sets of gear pairs which impart increasing rates of speed to the document feeder roll shaft 51. Three input gears 58′, 71′, and 95 are coaxially supported by the input drive shaft 93′, and three output gears 56′, 70′, and 96, are rotatably supported about the roll shaft 51′ by means of overrunning wrap spring clutches 57′, 72′, and 97. It does not matter which side of the gear 56′, 70′ or 96 the wrap spring clutches 57′, 72′, and 97 are arranged since they all operate in the same fashion, namely, engaging the gear to the shaft when the detent collars are free to rotate and disengaging the gear from the shaft when the detent collars are engaged by a stop or catch member.

The speed of the roll shaft 51′ is governed by the speed of the highest speed gear clutch 57′, 72′, or 97, which is engaged. Solenoids 100 and 101 actuate catch members 99 and 98 for the high speed gear clutches 72′ and 97. To obtain the slowest speed both of the solenoid actuated stop members 99 and 98 would engage their respective detent collars C to disengage the respective higher speed gears 70′ and 96 from the roll shaft 51′. To provide the intermediate speed only the highest speed stop member 98 would engage the highest speed gear clutch 97, thereby disengaging it from the roll shaft 57′. The lowest speed gear clutch 57′ would then be overrun. To provide the highest speed the stop members 98 and 99 would be disengaged from all clutches. The highest speed gear pair 95 and 96 through its engaged clutch 97 would govern the speed of the roll shaft 51′ with the lower speed gear pairs being overrun through their clutches.

In this manner it is possible, in accordance with the present invention, to provide an extremely simple drive mechanism for a document feeder 30 which enables the selection of a plurality of discrete speeds for the feeder so that the feeder may operate for producing images at discrete magnifications or minifications by moving document exposure.

Having thus described an appropriate mechanism for changing the speed at which the document feeder 30 will advance documents past the fixed optical system 24, and for automatically returning the mechanism to its base position, attention will now be directed to the mechanisms for translating the lens 25 to its appropriate position for reduction copying and for positioning the add mirror 60 in and out of the optical path.

Figure 6:
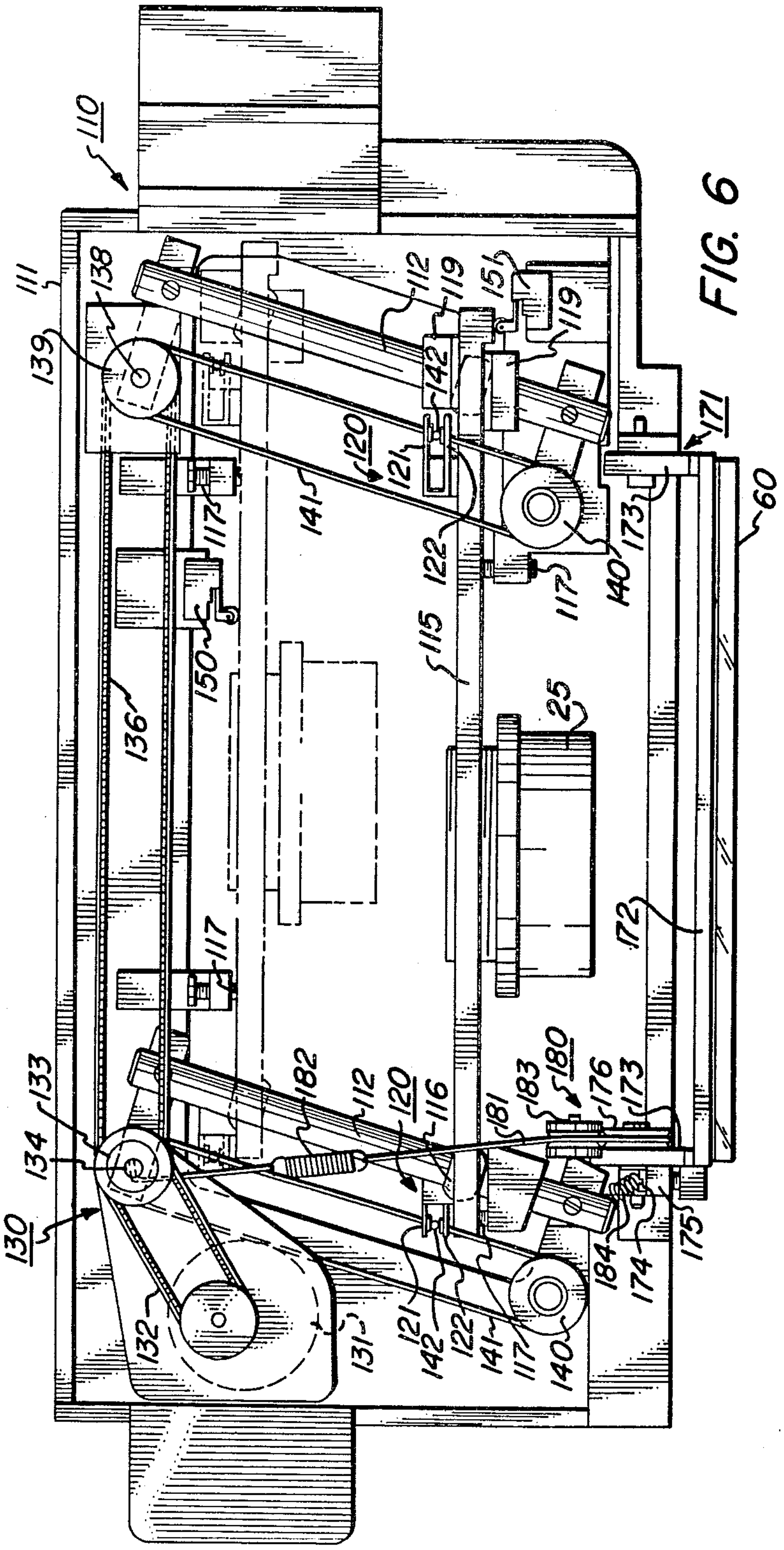
FIG. 6 is a top view of a lens and mirror translation apparatus in accordance with one embodiment of this invention.
Figure 7:
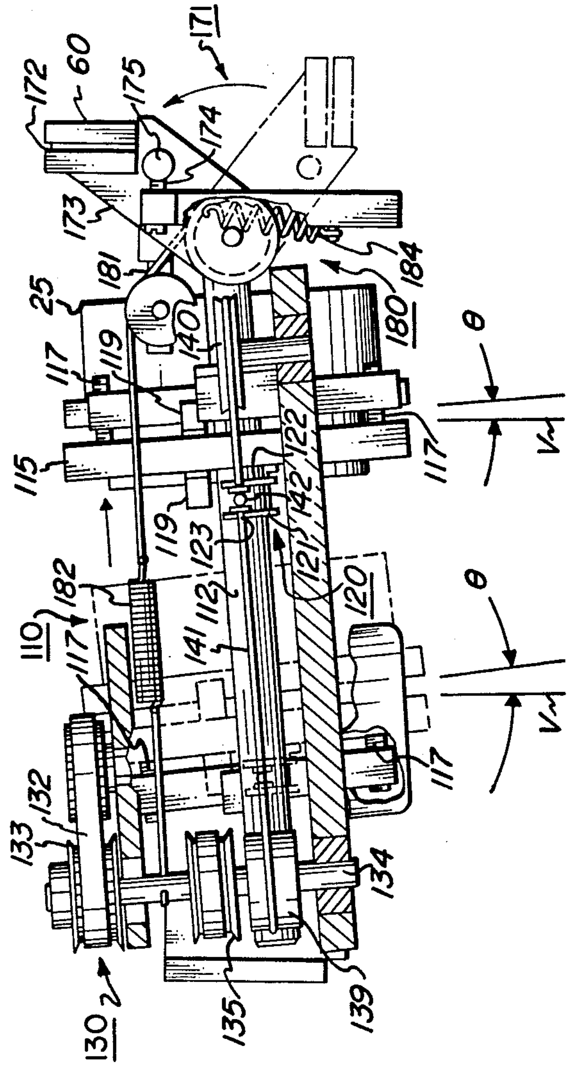
FIG. 7 is a side view partially cut away of the lens and mirror translation apparatus of FIG. 6.
Figure 8:
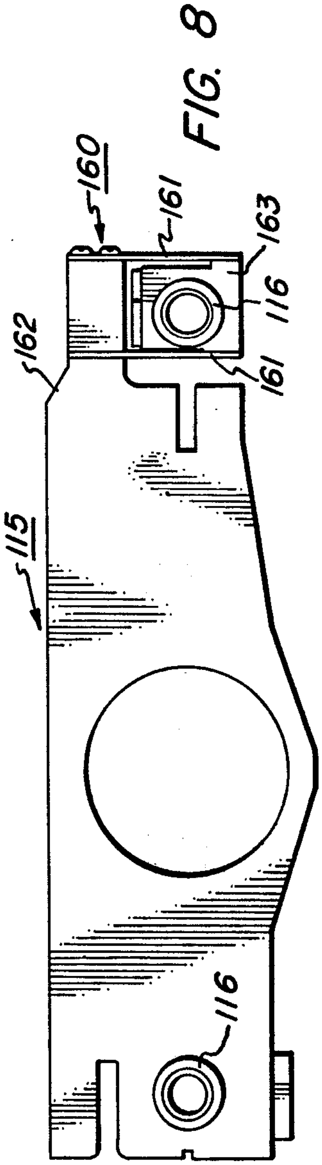
FIG. 8 is a front view of a lens carriage in accordance with one embodiment of this invention.

Referring now to FIGS. 1, 6, and 7, there is shown an apparatus 110 for translating the lens 25 and mirror 60 between their base magnification position (shown in solid lines in FIG. 1) and their reduction magnification position (shown in FIG. 1 in phantom). The apparatus 110 includes a frame member 111 adapted to be mounted in machine 10 to provide the arrangement shown in FIG. 1. A pair of spaced apart parallel guide rails 112 are secured to the frame member and are inclined upwardly and laterally. A lens carriage 115 is provided which is slidingly and pivotally supported upon the rails 112 by means of spherical bearings 116. The lens is secured to the lens carriage by any conventional means. This arrangement provides for relatively easy movement of the lens carriage 115 along the rails 112 even though that movement is inclined laterally and upwardly and the lens carriage pivots.

The use of spherical bearings 116 permits the lens carriage to pivot with respect to the plane of the rails 112. In this manner, it is possible to translate the lens 25 between its base position and its reduction position and also to pivot the lens in order to redirect the optical path in one or the other positions so as to avoid vignetting. Vignetting comprises the loss of a portion of the image through the interference in the optical path 61′ of one or more members. These members, for example, the mirror carriages or frame elements in the optical cavity interfere with the light paths and block portions of them thereby reducing the quality of the resulting image. The optical system 24 which has been described is adapted for use in a highly compact machine. With a compact optical system, it is difficult to provide multiple lens positions and an add mirror and other optical elements and frames in an arrangement wherein vignetting will not pose a serious problem.

To reduce the occurrence of vignetting, it has been found desirable to tilt the lens 25 about a generally horizontal axis or plane so as to redirect the light ray paths 61′ in order to minimize the interference of objects in the optics cavity. Therefore, in accordance with the embodiment shown, the lens carriage 115 is capable of tilting about a generally horizontal axis between a range of orientations. The orientation of the lens 25 as shown at the respective end of travel positions of carriage 115 is established by means of adjustable stops 117 against which the carriage is biased. Three adjustable screw type stops 116 or 117 supported by the frame 111 at the respective end of travel positions serve to orient the plane of the lens carriage.

In the embodiment shown in FIG. 7, the lens 25 in the base mode position (shown in phantom) is oriented at $\theta°$ to the vertical V. In the reduction mode position (shown in solid lines), however, in order to reduce vignetting caused by the full rate mirror 26, the lens 25 has been tilted about the horizontal axis so that it is at an angle of $\theta - X$ with respect to the vertical V.

Since the spherical bearings 116 allow the lens carriage 115 to freely pivot about a horizontal axis while riding on the rails 112, pads 119 are provided on at least one side of the carriage to limit its range of pivotal motion to a reasonable range required for changing the lens orientation. The pads 119 are secured to the lens carriage 115 and are spaced a desired amount above the rails 112 so as to restrict the degree to which the carriage may be pivoted with respect to the plane of the rails.

In order to bias the lens carriage 115 against the stops 117 at its respective end of travel positions, a compliance mechanism 120 has been devised. The compliance mechanism 120 in conjunction with the drive system 130 is effective to bias the lens carriage 115 firmly against the stop members 116 or 117 so that it will achieve its desired orientation and be free of movement due to vibration or other causes.

The drive system 130 for the lens translation apparatus 110 comprises a motor 131 connected by means of a timing belt 132 to a capstan 133 secured to shaft 134 journaled for rotation adjacent one of the rails 112. A second capstan 135 coaxially mounted to the shaft 134 is connected by means of a timing belt 136 to a third capstan (not shown) which is secured to shaft 138 journaled for rotation in the frame 111 adjacent the opposing side rail 112. A drive pulley 139 is also coaxially mounted to each of the shafts 134 and 138, adjacent one end of each of the respective rails 112. Adjacent the other end of each of the respective rails 112, an idler pulley 140 is rotatably supported by the frame 111. An endless drive cable loop 141 is provided about each respective drive pulley 139 and corresponding idler pulley 140 adjacent each of the rails 112. Each cable loop 141 includes a ball member 142 secured to the cable.

The carriage is connected to the drive cable 141 by means of the compliance mechanism 120 which comprises spaced apart leaf springs 121 mounted at each side of the lens carriage 115. Each spring has a slot 123 through which the drive cable 141 passes. The ball member 142 is trapped between the respective leaf springs 121 and 122 and provides the driving engagement between the cable 141 and the carriage. When the lens carriage 115 is to be advanced in one direction, the ball abuts the leaf spring 121 or 122 opposing that motion and causes the carriage to advance until it reaches the adjustable stop members 117.

The motor 131 is driven for a desired interval following the interception of the stop members by the carriage. This additional driving interval causes the leaf spring 121 or 122 to deflect and bias the carriage 115 against the stops. When the carriage 115 is advanced in the other direction, the opposing leaf spring 121 or 122 is engaged by the ball 142 of the drive cable 141 and the carriage is caused to advance to the opposing stops 117. The motor is again driven for an interval following such engagement to deflect the opposing leaf spring to provide the requisite bias of the carriage against the stops.

Switches 150 and 151 are provided which sense the end of travel positions of the lens carriage 115 for shutting of the motor 131 at the appropriate time. The switches 150 and 151 may also be used to sense jams in the translation mechanism and for conditioning the apparatus 10 for copying in the base mode or reduction modes, respectively.

The lens carriage 115 is provided with a compliance mechanism 160 to prevent it from binding up as it travels along the spaced apart parallel rails 112. The compliance mechanism is provided at one end of the carriage. The carriage 115 as previously stated supports spherical bearings 116 for sliding engagement with the rails 112. The compliance device 160 comprising two leaf springs 151 secured to the main carriage member 162 at one end and secured at their other end to a bearing support member 163 which is spaced from the main carriage 162. The leaf springs 161 provide for side to side compliance since they permit the bearing 116 in support 163 to deflect toward and away from the other bearing 116 which is supported in the main carriage member 162. The spring members 161 do not, however, permit movement of the bearing support 143 out of the plane of the carriage 115. In this manner, binding associated with lens translation is avoided since the leaf spring supported bearing member 163 is compliant with respect to changes in the distance between the rails 112.

A mechanism is also provided for translating the add mirror 60 from its inoperative position out of the optics path to its operative position for providing the previously described reflection cavity in accordance with the Spinelli et al optical system. The add mirror 60 is supported by a pivotally mounted carriage 171 comprising a horizontally extending support member 172 and two side members 173 pivotally secured to the frame assembly 111. An adjustable stop member comprising screw 174 is provided for intercepting a pin 175 secured to one of the pivotal carriage side members 173. The stop member 174 is effective to accurately set the operable position of the mirror 60. The pivotal carriage 171 is arranged to pivot about a substantially horizontally extending axis.

The drive system 180 for the pivotal carriage 171 comprises a cable 181 secured at one of its ends to the shaft 134 and adapted to be wraped thereabout, and to a hub portion 176 of a pivotal carriage side member 173 at its other end. A spring 182 is interposed in the drive cable to provide compliance. An idler pulley 183 secured to the optics frame 111 is utilized to appropriately direct the drive cable. The carriage 171 is spring biased toward its inoperative position by means of a spring 184 secured to the optics frame 111 at one end eccentrically to the hub 176 at its other end. Upon rotation of the shaft 134 the drive cable 181 connected to the add mirror carriage 171 is coiled up on the shaft, thereby pivoting the mirror 60 to its operable position against the action of the return spring 184. A single motor 131 is utilized to both drive the lens carriage 115 and the add mirror carriage 171. The compliance spring 182 is provided since the mirror 60 will be pivoted to its operable position prior to the lens 25 reaching its reduction position. When the mirror carriage 171 abuts the stop 174 the spring 182 continues to expand as the drive shaft 134 continues to coil up the cable while advancing the lens carriage. In this fashion a single drive motor 131 can be utilized to drive both optical elements 25 and 60 even though the time periods required to completely translate them do not coincide.

It has been noted above that the lens is arranged to translate both upwardly and laterally. The upwardly movement of the lens is a function of the optics geometry and aids in reducing vignetting. The lateral movement of the lens is for the purpose of moving the edge of the resulting image on the copy sheet into proper registration on the copy sheet. It is not essential in accordance with the present invention to maintain a common registration edge on the copy sheet for both the base and reduction modes of operation.

In the disclosed optical system changing the conjugate distance effects changes in the projected image magnification according to the following relationship:

$$TC = \left[\frac{f + \frac{f}{m}}{\text{Cos}\ \alpha}\right] + \left[\frac{f + fm}{\text{Cos}\ \alpha}\right]$$

wherein:

| | |
|---|---|
| TC | Total Conjugate |
| f | Lens Focal length |
| m | Magnification |
| $\frac{f + \frac{f}{m}}{\text{Cos}\ \alpha}$ | Object Conjugate |
| $\frac{f + fm}{\text{Cos}\ \alpha}$ | Image Conjugate |
| $\alpha$ | Angle between optical axis and lens axis |

For purposes of this application the total conjugate is defined as the distance along the principal ray from the object plane of the image plane. The object conjugate is defined as the distance along the principal ray from the object plane to the first nodal point of the lens and the image conjugate is defined as the distance along the principal ray from the image plane to the second nodal point of the lens.

The conjugate changing means in accordance with this invention has been described as being positioned on the object side of the lens, however, it should be apparent that if desired conjugate changing means could be employed on the image side of the lens.

Synchronized speed as the term is utilized herein refers to the fact that the imaging surface and document move simultaneously at a proportional or related rate of speed, for example, they move at the same relative speeds for 1 to 1 magnification or the document may move at a greater speed than the imaging surface for reduction magnification.

The patents, texts, and applications specifically set forth above are intended to be incorporated by reference into the present description.

While this invention has been described with reference to the structure disclosed herein, it is not necessarily confined to the details as set forth and this application is intended to cover such modifications or changes as may come within the scope of the following claims.

What is claimed is:

1. In an apparatus for viewing an original and for projecting an image thereof onto a moving imaging surface, said apparatus including a lens arranged along an optical path, means for changing the projected image magnification, said magnification changing means including means for translating said lens in a plane of motion between first and second discrete positions so that the projected magnification is a function of the lens position, the improvement wherein:

means are provided for automatically tilting said lens with respect to said plane of motion to a different extent at said first position than at said second position.

2. An apparatus as in claim 1, wherein said lens translation means includes means for translating said lens laterally and upwardly.

3. In an apparatus for viewing an original and for projecting an image thereof onto a moving imaging surface, said apparatus including a lens arranged along an optical path, means for changing the projected image magnification, said magnification changing means including means for translating said lens in a plane of motion between first and second discrete positions so that the projected magnification is a function of the lens position, the improvement wherein:

means are provided for tilting said lens with respect to said plane of motion to a different extent at said first position than at said second position; and wherein said lens translation means includes lens carriage means for transporting said lens, means for supporting said lens carriage for movement of said lens between said first and second positions, and adjustable means for stopping said lens carriage when said lens reaches said first or second positions, said stop means being operatively arranged to properly tilt said lens at said respective positions.

4. An apparatus as in claim 3, wherein said lens carriage is pivotally supported so that it may be pivoted about said plane of motion and wherein said adjustable stop means are arranged to engage said carriage to tilt said lens at said respective positions.

5. An apparatus as in claim 4, wherein said means for supporting said carriage for movement comprises a pair of parallel spaced apart rails and wherein said carriage is slidingly supported upon said rails by means of spherical bearings, and further including means for driving said carriage between said first and second positions.

6. An apparatus as in claim 5, wherein said drive means further includes compliance means for allowing said carriage to be overdriven against said stops so that it is biased thereagainst.

7. An apparatus as in claim 3, further including at least one reflector arranged along said optical path and means for translating said reflector between first and second discrete positions so that the projected magnification is a function of the lens and reflector respective positions.

8. An apparatus as in claim 7, wherein said reflector comprises an add reflector positionable in said optical path at said first position and out of said optical path at said second position.

9. An apparatus as in claim 3, which comprises a multi-mode viewing apparatus including a first reflector for scanning an original at a speed synchronized to the speed of said imaging surface, said first reflector receiving the image ray from said original and reflecting it, a second scanning reflector arranged to receive the reflected image ray from said first reflector and reflect it towards said lens, said second reflector scanning at a speed one-half the speed of said first reflector, and an add reflector selectively positionable into the reflected ray path from said second reflector for receiving and reflecting the image ray back to said second reflector for forming a reflection cavity therewith in one mode of operation and out of the ray path in a second mode of operation, said lens being arranged in said first position in said first mode of operation and in said second position in said second mode of operation, means for fixing said first and second reflectors at a given position in said first mode of operation, and means for feeding documents past said fixed reflectors at a speed synchronized to that of said imaging surface in said first mode of operation.

10. An apparatus as in claim 9, wherein said lens comprises a half lens having a reflector at its lens stop position.

11. In a reproducing apparatus including means for forming an image on a sheet of final support material, said image forming means including means for viewing an original and for projecting an image thereof onto a moving imaging surface, said viewing means including a lens arranged along an optical path, means for changing the projected image magnification, said magnification changing means including means for translating said lens in a plane of motion between first and second positions so that the projected magnification is a function of the lens position, the improvement wherein: means are provided for automatically tilting said lens with respect to said plane of motion to a different extent at said first position than at said second position.

12. An apparatus as in claim 11, wherein said lens translation means includes means for translating said lens laterally and upwardly.

13. In a reproducing apparatus including means for forming an image on a sheet of final support material, said image forming means including means for viewing an original and for projecting an image thereof onto a moving imaging surface, said viewing means including a lens arranged along an optical path, means for changing the projected image magnification, said magnification changing means including means for translating said lens in a plane of motion between first and second positions so that the projected magnification is a function of the lens position, the improvement wherein:

means are provided for tilting said lens with respect to said plane of motion to a different extent at said first position than at said second position; and wherein said lens translation means includes lens carriage means for transporting said lens, means for supporting said lens carriage for movement of said lens between said first and second lens positions, and adjustable means for stopping said lens carriage when said lens reaches said first or second positions, said stop means being operatively arranged to properly tilt said lens at said respective positions.

14. An apparatus as in claim 13, wherein said lens carriage is pivotally supported so that it may be pivoted about said plane of motion and wherein said adjustable stop means are arranged to engage said carriage to tilt said lens at said respective positions.

15. An apparatus as in claim 14, wherein said means for supporting said carriage for movement comprises a pair of parallel spaced apart rails and wherein said carriage is slidingly supported upon said rails by means of spherical bearings, and further including means for driving said carriage between said first and second positions.

16. An apparatus as in claim 15, wherein said drive means further includes compliance means for allowing said carriage to be overdriven against said stops so that it is biased thereagainst.

17. An apparatus as in claim 11, further including at least one reflector arranged along said optical path and means for translating said reflector between first and second discrete positions so that the projected magnification is a function of the lens and reflector respective positions.

18. An apparatus as in claim 17, wherein said reflector comprises an add reflector positionable in said optical path at said first position and out of said optical path at said second position.

19. An apparatus as in claim 11, which comprises a multi-mode viewing apparatus including a first reflector for scanning an original at a speed synchronized to the speed of said imaging surface, said first reflector receiving the image ray from said original and reflecting it, a second scanning reflector arranged to receive the reflected image ray from said first reflector and reflect it towards said lens, said second reflector scanning at a speed one-half the speed of said first reflector, and an add reflector selectively positionable into the reflected ray path from said second reflector for receiving and reflecting the image ray back to said second reflector for forming a reflection cavity therewith in one mode of operation and out of the ray path in a second mode of operation, said lens being arranged in said first position in said first mode of operation and in said second position in said second mode of operation, means for fixing said first and second reflectors at a given position in said first mode of operation, and means for feeding documents past said fixed reflectors at a speed synchronized to that of said imaging surface in said first mode of operation.

20. An apparatus as in claim 19, wherein said lens comprises a half lens having a reflector at its lens stop position.

21. An apparatus as in claim 11, wherein said apparatus comprises an electrostatographic reproducing machine wherein said imaging surface comprises a photosensitive surface and further including means for charging said surface, whereby exposure to said projecting image forms a latent electrostatic image thereon, means for developing said latent image to render it visible and means for transferring said visible image to a sheet of final support material.

22. In an apparatus for viewing an original and for projecting an image thereof onto a moving imaging surface, said apparatus including a lens arranged along an optical path, means for changing the projected image magnification, said magnification changing means including means for translating said lens in a plane of motion between first and second discrete positions so that the projected magnification is a function of the lens position, the improvement wherein:

means are provided for reducing the occurrence of vignetting in said apparatus, said vignetting reduction means comprising, means for tilting said lens with respecct to said plane of motion to a different extent at said first position than at said second position.

23. In a reproducing apparatus including means for forming an image on a sheet of final support material, said image forming means including means for viewing an original and for projecting an image thereof onto a moving imaging surface, said viewing means including a lens arranged along an optical path, means for changing the projected image magnification, said magnification changing means including means for translating said lens in a plane of motion between first and second positions so that the projected magnification is a function of the lens position, the improvement wherein:

means are provided for reducing the occurrence of vignetting in said viewing means, said vignetting reducing means including means for tilting said lens with respect to said plane of motion to a different extent at said first position than at said second position.

24. An apparatus as in claim 23, wherein said apparatus comprises an electrostatographic reproducing machine wherein said imaging surface comprises a photosensitive surface, and further including means for charging said surface, whereby exposure to said projected image forms a latent electrostatic image thereon, means for developing said latent image to render it visible and means for transferring said visible image to a sheet of final support material.

* * * * *